US009169906B2

(12) United States Patent
Inagaki et al.

(10) Patent No.: US 9,169,906 B2
(45) Date of Patent: Oct. 27, 2015

(54) LINK APPARATUS

(71) Applicant: DENSO CORPORATION, Kariya, Aichi-pref. (JP)

(72) Inventors: Noriyuki Inagaki, Chiryu (JP); Shinsuke Miyazaki, Chiryu (JP); Takaaki Oohashi, Iwakura (JP); Koji Hashimoto, Anjo (JP); Yuichiro Moritani, Kariya (JP)

(73) Assignee: DENSO CORPORATION, Kariya (JP)

( * ) Notice: Subject to any disclaimer, the term of this patent is extended or adjusted under 35 U.S.C. 154(b) by 372 days.

(21) Appl. No.: 13/736,207

(22) Filed: Jan. 8, 2013

(65) Prior Publication Data

US 2013/0174689 A1    Jul. 11, 2013

(30) Foreign Application Priority Data

Jan. 10, 2012    (JP) ................................. 2012-002276

(51) Int. Cl.
*F02M 25/07* (2006.01)
*F16H 25/00* (2006.01)

(52) U.S. Cl.
CPC ........... *F16H 25/00* (2013.01); *F02M 25/0773* (2013.01); *F02M 25/0793* (2013.01); *Y02T 10/121* (2013.01); *Y10T 74/2107* (2015.01)

(58) Field of Classification Search
CPC . F16H 2025/2271; F16H 25/00; F16H 25/02; Y10T 74/2107
USPC ............... 123/568.17–568.19, 568.2, 568.24, 123/568.26
See application file for complete search history.

(56) References Cited

U.S. PATENT DOCUMENTS

| 3,164,459 | A  | * | 1/1965  | Bower ............................ 65/155 |
| 3,956,434 | A  | * | 5/1976  | Dickensheets et al. ...... 261/39.3 |
| 2004/0025628 | A1 | * | 2/2004  | Mann et al. ..................... 74/608 |
| 2007/0006844 | A1 | * | 1/2007  | Neise et al. ................... 123/399 |
| 2007/0289091 | A1 | * | 12/2007 | Espey .............................. 16/91 |
| 2010/0206274 | A1 | * | 8/2010  | Furukawa et al. ....... 123/568.11 |
| 2011/0023846 | A1 |   | 2/2011  | Miyazaki et al. |

FOREIGN PATENT DOCUMENTS

| JP | 63-154374 | | 10/1988 |
| JP | 10-331960 | | 12/1998 |
| JP | 10331960 | A * | 12/1998 |
| JP | 2010-265923 | | 11/2010 |

OTHER PUBLICATIONS

Office Action (2 pages) dated Dec. 10, 2013, issued in corresponding Japanese Application No. 2012-002276 and English translation (2 pages).
Office Action (2 pages) dated May 27, 2014, issued in corresponding Japanese Application No. 2012-002276 and English translation (3 pages).

* cited by examiner

*Primary Examiner* — Hung Q Nguyen
*Assistant Examiner* — Josh Campbell
(74) *Attorney, Agent, or Firm* — Nixon & Vanderhye P.C.

(57) ABSTRACT

A link apparatus includes a cam plate, a lever and an accommodation member. The cam plate has a cam groove. The lever has a roller engaged with the cam groove and a pin which is inserted through a center of the roller so that the roller is rotatably supported on the pin. The accommodation member accommodates the cam plate and the lever. The accommodation member and the pin have a distance "A" therebetween. The roller has a thickness "B" along an axial direction of the pin. The value of the distance "A" is smaller than the value of the thickness "B".

3 Claims, 5 Drawing Sheets

PRIOR ART

LINK APPARATUS

CROSS-REFERENCE TO RELATED APPLICATION

This application is based on Japanese Patent Application No. 2012-2276 filed on Jan. 10, 2012, the disclosure of which is incorporated herein by reference.

TECHNICAL FIELD

The present disclosure relates to a link apparatus in which a roller is engaged with a cam groove.

BACKGROUND

JP-2011-32929A describes a link apparatus in which a roller is engaged with a cam groove. The link apparatus will be described with reference to FIG. 7. In the link apparatus shown in FIG. 7, the same parts and components as those in embodiments of the present disclosure, which will be described later, are indicated with the same reference numerals.

According to JP-2011-32929A, a low-pressure-loop exhaust gas recirculation (LPL-EGR) adjusting valve 5 is driven by an electric actuator 6 configured with an electric motor 43 and a gear reduction mechanism 44. A link mechanism 8 varies an output characteristic of the electric actuator 6 to drive an intake throttle valve 7.

The link mechanism 8 is comprised of: a cam plate 14 provided in a cam groove 13 in such a manner as to rotate along with the LPL-EGR adjusting valve 5; and a lever 16 which rotates along with the intake throttle valve 7 and has a groove-engaging body 15 engaged with the cam groove 13. The groove-engaging body 15 has a roller 15a and a pin 15b.

The pin 15b is a cylinder-shape shaft body provided in the lever 16, and is inserted through a penetration hole formed in a center of the roller 15a.

The roller 15a is rotatably supported on the pin 15b and rotates in the cam groove 13.

The roller 15a is prevented from being dropped from the pin 15b by a roller holder. The roller holder is provided in a distal end portion of the pin 15b, such as a diameter expansion portion, a circlip, or an E-shape ring.

When the roller holder is disengaged from the pin 15b, it is likely that the roller 15a may be dropped from the pin 15b.

When the roller 15a is dropped from the pin 15b, it is likely that the dropped roller 15a is involved into a moveable member such as gear. In this case, the moveable member may be locked (fixed) by the roller 15a.

Thus, when the roller holder is disengaged from the pin 15b, a malfunction may occur due to the dropped roller 15a.

In addition, other link mechanism in which the roller 15a is supported by the pin 15b may have the same issue.

SUMMARY

It is an object of the present disclosure is to provide a link apparatus in which a roller cannot be dropped from a pin.

According to an aspect of the present disclosure, a link apparatus is configured in such a manner that the value of a distance "A" is smaller than the value of a thickness "B". The distance "A" represents a distance between a pin and an accommodation member. The thickness "B" represents a thickness of a roller along an axial direction of the pin.

The accommodation member prevents the roller from being dropped from the pin. Even though a roller holder is disengaged from the pin, the roller cannot be dropped from the pin.

Therefore, a possibility of a malfunction occurred due to a dropped roller is constricted, and an operation reliability of a system using the link apparatus can be improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1A:
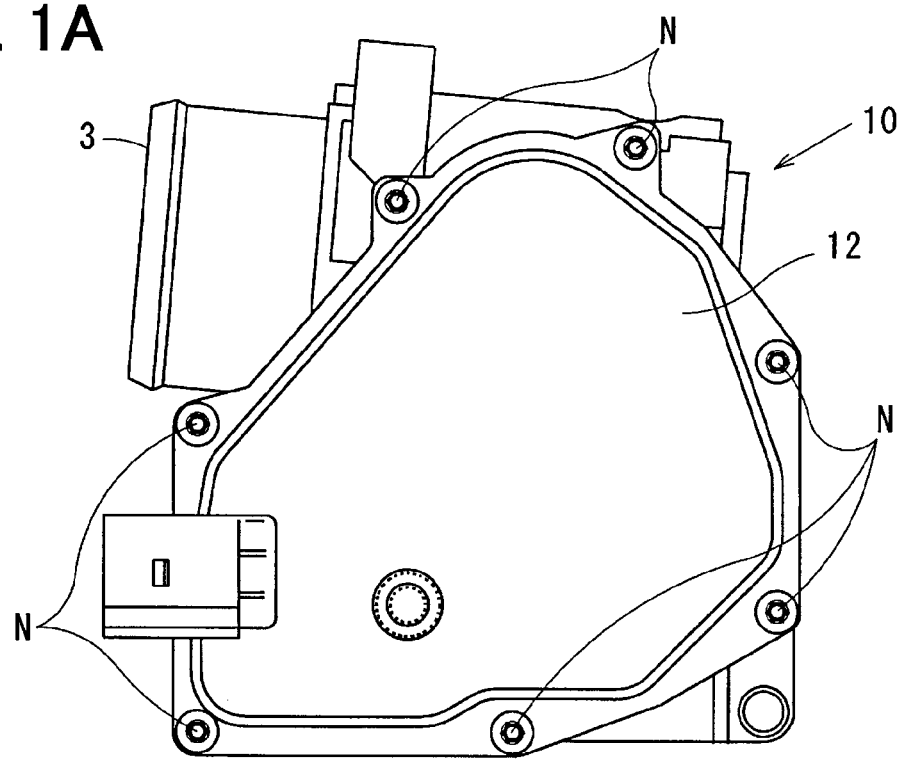
FIGS. 1A and 1B are plan views showing a valve unit assembled with and without a cover, according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

With reference to drawings, a low-pressure-loop exhaust gas recirculation (LPL-EGR) system 1 to which the present disclosure is applied will be described.

The LPL-EGR system 1 includes: a LPL-EGR adjusting valve 5 which adjusts a flow passage area of a LPL-EGR passage 4 through which an exhaust gas recirculation gas (EGR gas) is introduced into an intake passage 3; an electric actuator 6 which drives the LPL-EGR adjusting valve 5; an intake throttle valve 7 for generating an intake negative-pressure at a confluent portion of the intake passage 3 and the LPL-EGR passage 4; and a link mechanism 8 for driving the intake throttle valve 7 by varying an output characteristic of the electric actuator 6.

The LPL-EGR adjusting valve 5, the electric actuator 6, the intake throttle valve 7, and the link mechanism 8 are provided in a valve unit 10.

A housing 11 of the valve unit 10 configures a part of the intake passage 3 and the LPL-EGR passage 4. The intake throttle valve 7 is provided in the intake passage 3 inside the housing 11. The LPL-EGR adjusting valve 5 is provided in the LPL-EGR passage 4 inside the housing 11.

The housing 11 further has an accommodation chamber to accommodate the electric actuator 6 and the link mechanism 8. The accommodation chamber is defined by assembling a cover 12 to the housing 11. The housing 11 and the cover 12 correspond to an accommodation member.

The link mechanism 8 includes: a cam plate 14 which has a cam groove 13; and a lever 16 which has a groove-engaging body 15 engaging with the cam groove 13. The groove-engaging body 15 has a roller 15a and a pin 15b.

The cam plate 14 rotated together with the LPL-EGR adjusting valve 5 is driven by the electric actuator 6.

The lever 16 is rotated together with the intake throttle valve 7.

The groove-engaging body 15 includes: the roller 15a which is engaged with the cam groove 13; and the pin 15b which is inserted through a center of the roller 15a so that the roller 15a is rotatably supported on the pin 15b.

The pin 15b is provided to the lever 16.

Figure 2:
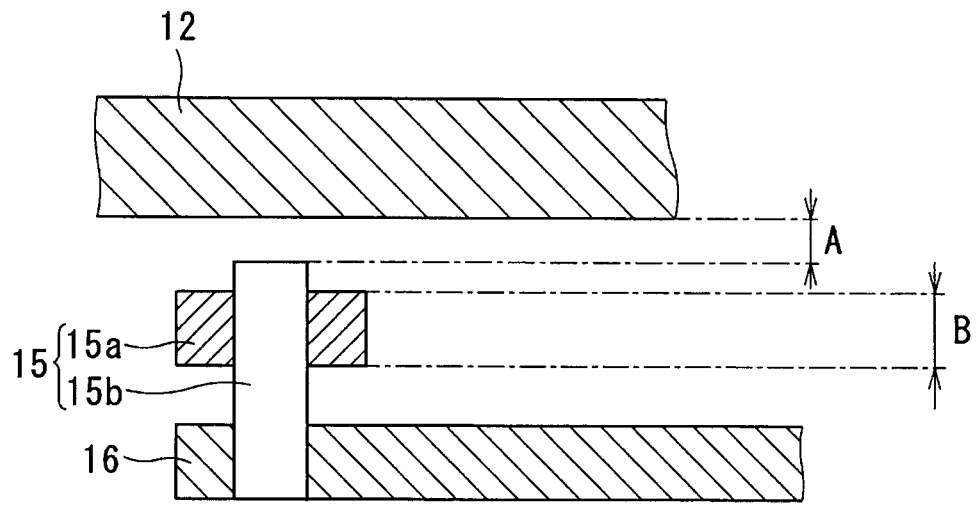
FIG. 2 is a cross-section view showing a relationship between a pin, a roller, and a cover, according to the first embodiment.

As shown in FIG. 2, a distance "A" represents to a distance between the pin 15b and the accommodation member which accommodates the link mechanism 8.

A thickness "B" represents to a thickness of the roller 15a in an axial direction of the pin 15b.

The distance "A" and the thickness "B" are defined so that the value of the distance "A" is smaller than the value of the thickness "B".

Hereafter, embodiments apply to the present disclosure will be described with reference to the drawings. The present disclosure is not limited to the embodiments. In the embodiments, the same parts and components as those in the first embodiment are indicated with the same reference numerals.

First Embodiment

Referring to FIGS. 1 to 4, a first embodiment will be described hereinafter.

Figure 3:
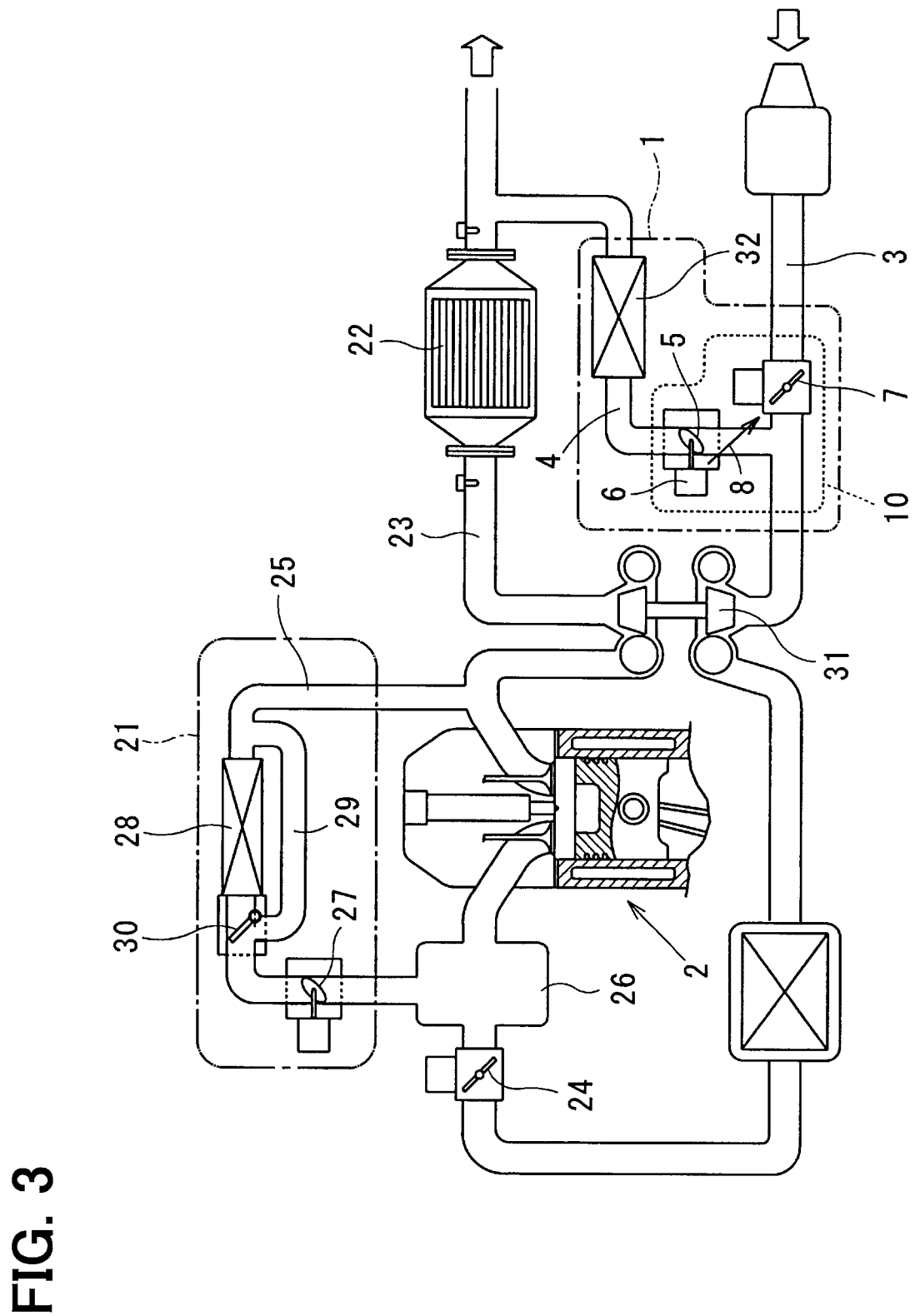
FIG. 3 is a schematic view showing an engine intake/exhaust system according to the first embodiment.

Referring to FIG. 3, an engine intake/exhaust system will be described.

The engine intake/exhaust system is provided with a high-pressure-loop exhaust gas recirculation system (HPL-EGR system) 21 and the LPL-EGR system 1.

The HPL-EGR system 21 is connected with an inside of an exhaust passage 23 in a high exhaust-pressure area and an inside of the intake passage 3 in a high intake-pressure area. The high exhaust-pressure area is an area where a high exhaust-pressure is generated upstream of a diesel particulate filter (DPF) 22. The high intake-pressure area is an area where a high intake-pressure is generated downstream of a throttle valve 24. The HPL-EGR system 21 is an exhaust gas recirculation system for returning a large quantity of the EGR gas to an engine 2. The HPL-EGR system 21 includes a HPL-EGR passage 25 for returning a part of the exhaust gas into downstream of the intake passage 3 as the EGR gas.

Specifically, as shown in FIG. 3, one end of the HPL-EGR passage 25 is connected to an exhaust manifold and the other end is connected to a surge tank 26 of an intake manifold.

The HPL-EGR system 21 includes a HPL-EGR adjusting valve 27 which adjusts flow passage area of the HPL-EGR passage 25, a HPL-EGR cooler 28 which cools the EGR gas returning to the intake passage 3, a high-pressure cooler bypass 29 which bypasses the HPL-EGR cooler 28, and a HPL-EGR cooler switching valve 30 which switches between the HPL-EGR cooler 28 and the high-pressure cooler bypass 29.

It should be noted that the HPL-EGR cooler 28, the high-pressure cooler bypass 29 and the HPL-EGR cooler switching valve 30 are not always necessary.

The LPL-EGR system 1 is connected with the inside of the exhaust passage 23 in a low exhaust-pressure area and the inside of the intake passage 3 in a low intake-pressure area. The low exhaust-pressure area is an area where a low exhaust-pressure is generated downstream of the DPF 22. The low intake-pressure area is an area where a low intake-pressure is generated upstream of the throttle valve 24. The LPL-EGR system 1 is an exhaust gas recirculation system for returning a small quantity of the EGR gas to the engine 2. The LPL-EGR system 1 includes the LPL-EGR passage 4 for returning a part of the exhaust gas into upstream of the intake passage 3 as the EGR gas.

Specifically, one end of the LPL-EGR passage 4 is connected to an exhaust manifold downstream of the DPF 22 and the other end is connected to the intake passage 3 upstream of a compressor 31 of a turbocharger.

The LPL-EGR system 1 includes the LPL-EGR adjusting valve 5 which adjusts flow passage area of the LPL-EGR passage 4, and a LPL-EGR cooler 32 which cools the EGR gas returning to the intake passage 3.

Further, the LPL-EGR system 1 is provided with the intake throttle valve 7 at a confluent portion of the intake passage 3 and the LPL-EGR passage 4.

Even if the intake throttle valve 7 fully throttles the intake passage 3, a part of the intake passage 3 is opened. Specifically, even if the intake throttle valve 7 fully throttles the intake passage 3, about 10% of flow passage area of the intake passage 3 is opened (refer to a minimum gas flow rate indicated by a solid line Y in FIG. 4).

The HPL-EGR system 21 and the LPL-EGR system 1 are controlled by an engine control unit (ECU).

The ECU is an engine control device using a microcomputer. An EGR control program is stored in the ECU to operate the HPL-EGR system 21 and the LPL-EGR system 1, according to an engine operation state. Specifically, the ECU controls an operation of each part of the HPL-EGR system 21 and the LPL-EGR system 1 based on the engine operation state transmitted from a sensor and the EGR control program stored in the ECU.

In the LPL-EGR system 1, since the low-pressure exhaust gas in the exhaust passage is returned to the intake passage 3, a small quantity of the EGR gas can be controlled to return to the intake passage 3 of the engine 2. Thus, even in a case that a large quantity of the EGR gas is necessary to be returned into the engine 2, it is difficult to return a large quantity of the EGR gas by the LPL-EGR system 1.

According to the present embodiment, the LPL-EGR system 1 is provided with the intake throttle valve 7 which generates an intake negative-pressure in the intake passage 3. In an engine operation state where a large quantity of the EGR gas is required in the LPL-EGR system 1, the intake throttle valve 7 is controlled to be closed so that a large quantity of the EGR gas can be returned to the engine 2.

In a low-concentration control condition where a small quantity of the EGR gas is returned to the engine 2 in the LPL-EGR system 1, the intake throttle valve 7 is fixed at a fully-open position to generate no intake negative-pressure and only the LPL-EGR adjusting valve 5 is controlled.

In a high-concentration control condition where a large quantity of the EGR gas is returned to the engine 2 in the LPL-EGR system 1, an opening degree of the LPL-EGR adjusting valve 5 is increased and an opening degree of the intake throttle valve 7 is decreased to increase the intake negative-pressure.

As the above description, in the low-concentration control condition, the intake throttle valve 7 is fixed at a fully-open position and only the LPL-EGR adjusting valve 5 is controlled. In the high-concentration control condition, it is necessary that the opening degree of the intake throttle valve 7 is controlled according to the opening degree of the LPL-EGR adjusting valve 5.

Thus, an exclusive actuator for driving the LPL-EGR adjusting valve 5 and another exclusive actuator for driving the intake throttle valve 7 are necessary, which lead to an increase in manufacturing cost, size, and weight.

According to the present embodiment, as shown in FIG. 3, the LPL-EGR system 1 includes the electric actuator 6 which drives the LPL-EGR adjusting valve 5 and the link mechanism 8 which varies an output characteristic of the electric actuator 6 to drive the intake throttle valve 7. The LPL-EGR system 1 is configured in such a manner as to drive the intake throttle valve 7 according to an output of the electric actuator 6 transmitted via the link mechanism 8.

The link mechanism 8 includes a characteristic varying portion which varies the output characteristic of the electric actuator 6 and transmits the output characteristic to the intake throttle valve 7. As the opening degree of the LPL-EGR adjusting valve 5 becomes larger after its specified position, the opening degree of the intake throttle valve 7 becomes smaller (refer to FIG. 4).

Figure 4:
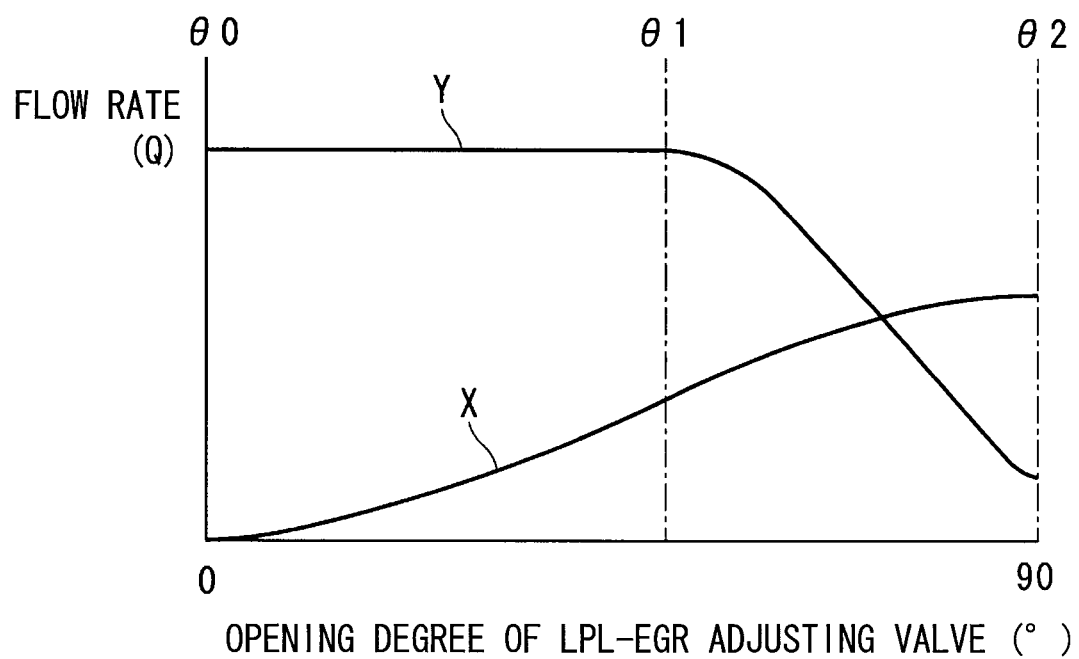
FIG. 4 is a graph showing a relationship between an EGR flow rate and an intake flow rate, due to an opening degree of a LPL-EGR adjusting valve, according to the first embodiment.

In FIG. 4, a solid line "X" represents a variation in EGR gas flow rate relative to the opening degree of the LPL-EGR adjusting valve 5, and a solid line "Y" represents a variation in intake air flow rate due to the intake throttle valve 7 relative to the opening degree of the LPL-EGR adjusting valve 5.

As mentioned above, the LPL-EGR adjusting valve 5 and the intake throttle valve 7 are connected via the link mechanism 8, and are driven by the electric actuator 6.

Figure 1B:
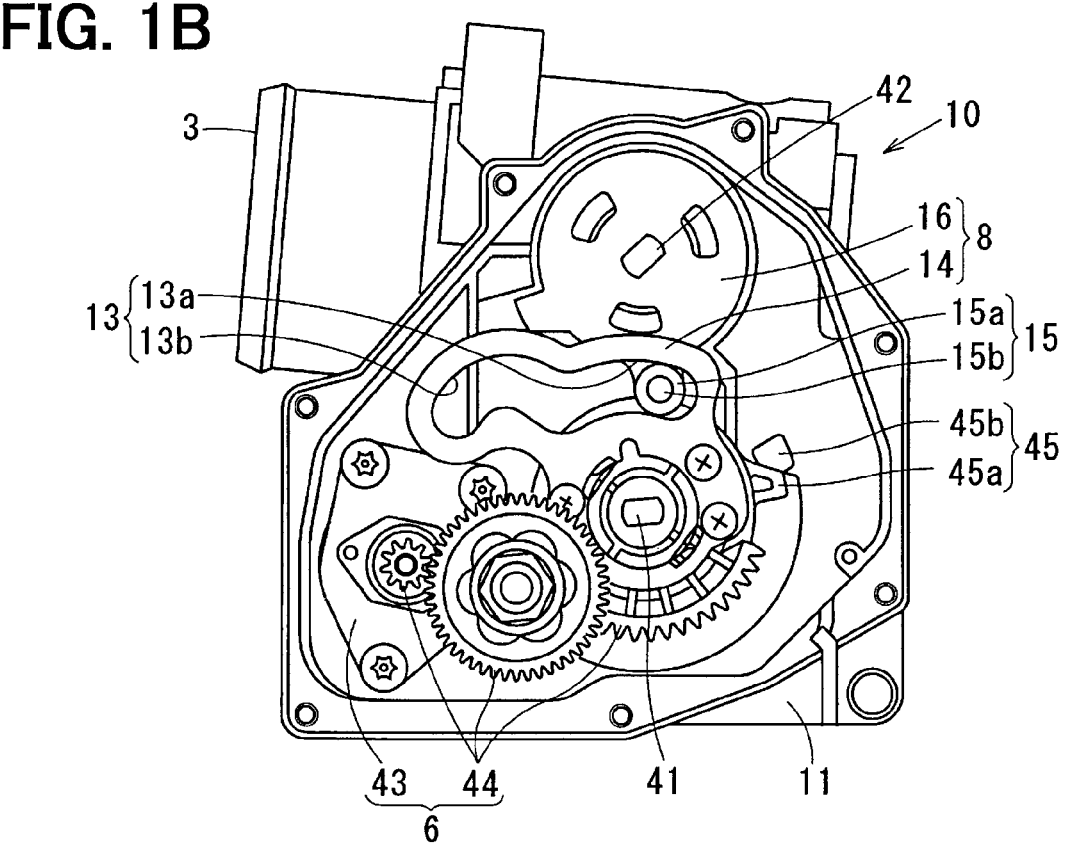

As shown in FIGS. 1A and 1B, the LPL-EGR adjusting valve 5, the electric actuator 6, the intake throttle valve 7, and the link mechanism 8 are provided in the valve unit 10.

The valve unit 10 includes the housing 11 defining the confluent portion of the LPL-EGR passage 4 and the intake passage 3, the LPL-EGR adjusting valve 5, the electric actuator 6, the intake throttle valve 7 and the link mechanism 8, which will be schematically described hereinafter.

The LPL-EGR adjusting valve 5 is a butterfly valve arranged in the LPL-EGR passage 4, and is rotated along with a LPL-EGR shaft 41 which is rotatably supported on the housing 11.

The intake throttle valve 7 is another butterfly valve arranged in the intake passage 3, and is rotated along with an intake throttle shaft 42 which is rotatably supported on the housing 11.

The LPL-EGR shaft 41 and the intake throttle shaft 42 are arranged in parallel.

The electric actuator 6 is comprised of an electric motor 43 (for example, DC motor) and a gear reduction mechanism 44 which reduces an output speed of the electric motor 43 to increase an output torque of the electric motor 43. An output of the gear reduction mechanism 44 drives the LPL-EGR adjusting valve 5 and the intake throttle valve 7 via the link mechanism 8.

The link mechanism 8 is arranged on an exterior surface of the housing 11. The link mechanism 8 varies the output characteristic (rotation characteristic) of the electric actuator 6 to drive the intake throttle valve 7. The link mechanism 8 is comprised of the cam plate 14 which rotates along with the LPL-EGR adjusting valve 5 and the lever 16 which rotates along with the intake throttle valve 7.

The cam plate 14 is plate-shaped and is a driving plate made of material having high antiwear quality, such as nylon. The cam plate 14 is perpendicularly connected to one end of the LPL-EGR shaft 41.

Also, the lever 16 is plate-shaped and is a driven plate made of material having high antiwear quality, such as nylon. The lever 16 is perpendicularly connected to one end of the intake throttle shaft 42 so that a rotation end portion of the lever 16 overlaps relative to the cam plate 14 at a specified interval.

The characteristic varying portion of the link mechanism 8, which varies the output characteristic of the electric actuator 6, is comprised with the cam groove 13 provided at a position apart from a rotation center of the cam plate 14 and the groove-engaging body 15 provided at a position apart from a rotation center of the lever 16 in such a manner as to engage with the cam groove 13.

The groove-engaging body 15 is comprised of the cylinder-shaped roller (rotation-difference absorber) 15a which is fitted into the cam groove 13 and the pin (shaft body) 15b which rotatably supports the roller 15a fixed to the rotation end portion of the lever 16. In addition, the pin 15b is substantially cylinder-shaped. The pin 15b and the lever 16 may be integrally formed from a single integral piece. Alternatively, the pin 15b may be individually formed and then fixed on the lever 16.

A cam profile of the cam groove 13 is provided with a full-open keeping cam groove 13a and an intake-throttle cam groove 13b.

The full-open keeping cam groove 13a is an arc groove having the same center as the cam plate 14. The full-open keeping cam groove 13a is formed in such a manner that the intake throttle valve 7 is kept at a full-open position while the LPL-EGR adjusting valve 5 is positioned in a range from a full-close position □0 (in FIG. 4, EGR valve angle=0) to a specified middle position □1.

The intake-throttle cam groove 13b is continuously formed from an end portion of the full-open keeping cam groove 13a. The intake-throttle cam groove 13b is tilted relative to the full-open keeping cam groove 13a. The intake-throttle cam groove 13b is formed in such a manner that the lever 16 rotates so that the LPL-EGR adjusting valve 5 rotates from the middle position □1 to a full-open position □2 (in FIG. 4, EGR valve angle=90) and the intake throttle valve 7 is rotated from the full-open position to the full-close position.

A LPL-EGR return spring is provided in the valve unit 10 to urge the LPL-EGR adjusting valve 5 to a close-valve direction so that the LPL-EGR adjusting valve 5 closes the LPL-EGR passage 4 in a case where the electric actuator 6 is shut down.

Further, an EGR valve stopper 45 is provided in the valve unit 10 so that a minimum opening degree of the LPL-EGR adjusting valve 5 is constricted to the full-close position. In the EGR valve stopper 45, when a protrusion portion 45a provided in the cam plate 14 is brought into contact with a convex portion 45b provided in the housing 11, the LPL-EGR adjusting valve 5 is positioned at the full-close position.

The electric actuator 6 and the link mechanism 8 are assembled into the accommodation chamber of the housing 11. The accommodation chamber is defined by the cover and the housing. The cover 12 is fixed to the housing 11 by using a fastener such as screw "N". That is, after the electric actuator 6 and the link mechanism 8 are assembled into the accommodation chamber, the cover 12 is fixed to the housing 11 so that the accommodation chamber is closed from the outside.

The cover 12 is a cover member attached in a direction parallel to the cam plate 14 and the lever 16. In this case, the housing 11 is made of a heat-resistant resin or a metal such as aluminum. The cover 12 is also made of a resin or a metal such as aluminum.

Since the cover 12 is provided to be parallel to the lever 16, the axial direction of the pin 15b and an inside surface of the cover 12 are perpendicularly crossed as shown in FIG. 2. In addition, FIG. 2 shows an essential configuration of the present disclosure. The cam plate 14 is not shown in FIG. 2.

As shown in FIG. 2, the distance "A" represents to the distance between the pin 15b and the cover 12, and the thickness "B" represents to the thickness of the roller 15a in the axial direction of the pin 15b. According to the present embodiment, the valve unit 10 is configured in such a manner that the value of the distance "A" is smaller than the value of the thickness "B".

Specifically, the pin 15b is made longer in its axial direction so that the distance "A" becomes shorter. The cover 12 (accommodation member) is moved close to a distal end of the pin 15b so that the distance "A" becomes shorter. The roller 15a is formed thicker in the axial direction so that the thickness "B" becomes larger. Therefore, a relationship of the distance "A" and the thickness "B" can be provided so that the value of the distance "A" is smaller than the value of the thickness "B".

More specifically, the inside surface of the cover 12 is formed in such a manner that at least an area of the surface above a moveable orbit of the pin 15b is flat. Therefore, the distance "A" is always constant without respect to the position of the pin 15b.

In the present embodiment, even when the pin 15b is rotated, the relationship of the distance "A" and the thickness "B" always satisfies that the value of the distance "A" is smaller than the value of the thickness "B".

Since the relationship of the distance "A" and the thickness "B" is maintained that the value of the distance "A" is smaller than the value of the thickness "B", the roller 15a cannot be dropped from the pin 15b without respect to the position of the pin 15b.

Even if a roller holder, which is provided in the distal end portion of the pin 15b, such as a diameter expansion portion, a circlip, or an E-shape ring, is disengaged, the inside surface of the cover 12 prevents the roller 15a from being dropped. Thus, the roller 15a cannot be dropped from the pin 15b.

Therefore, a lock generated between moveable members in the valve unit 10 due to the dropped roller 15a can be prevented, and an operation reliability of the valve unit 10 and an operation reliability of the LPL-EGR system 1 can be improved.

Second Embodiment

Figure 5:
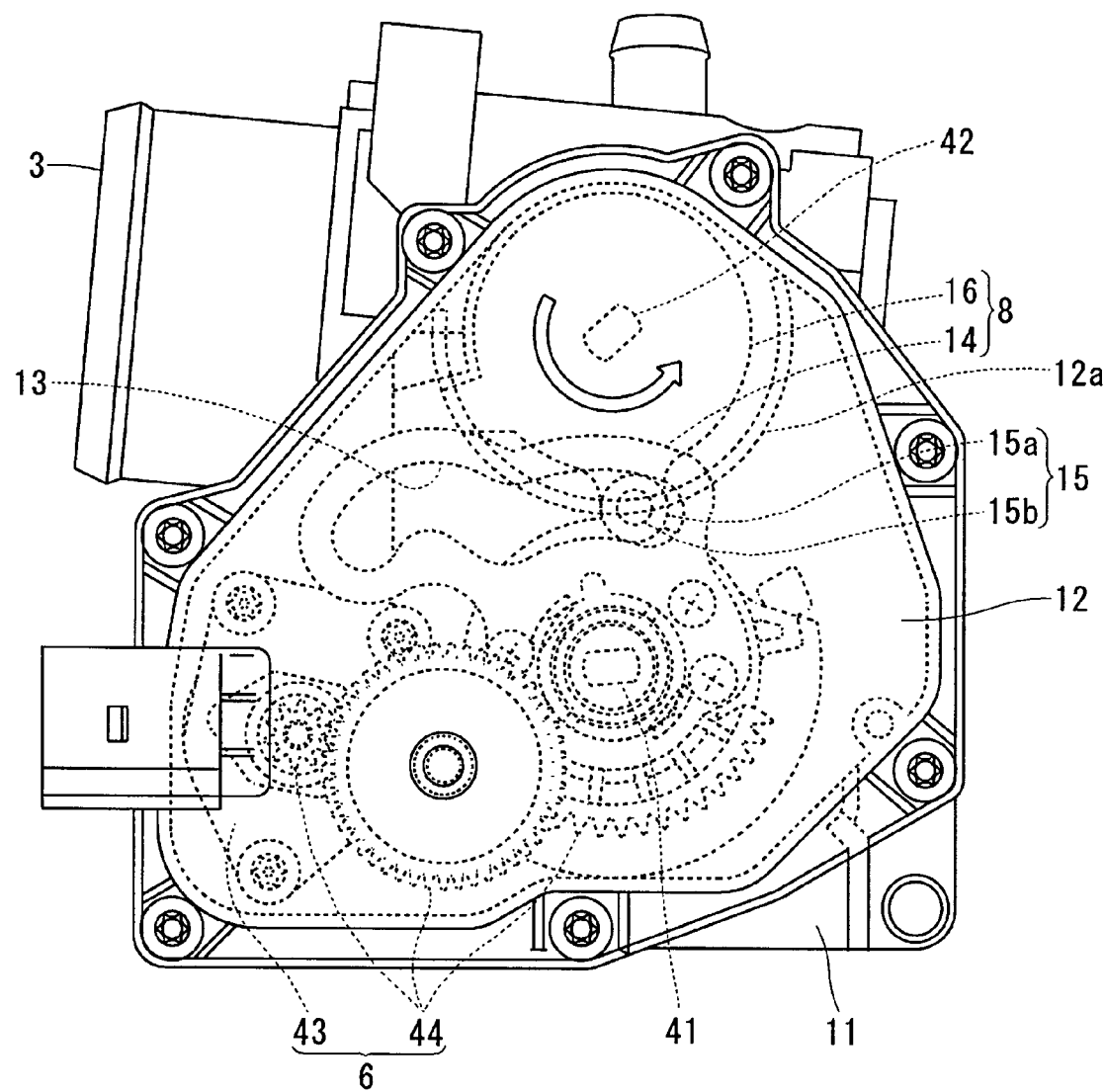
FIG. 5 is a schematic view showing a valve unit according to a second embodiment of the present disclosure.
Figure 6:
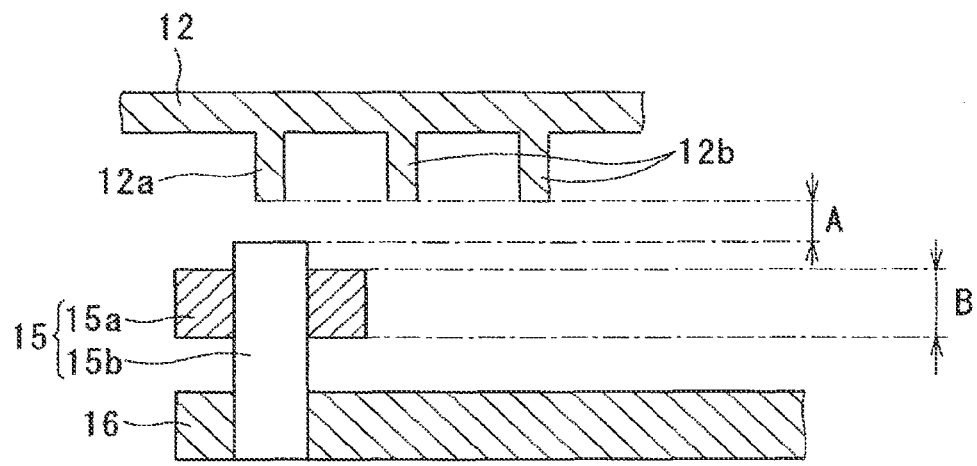
FIG. 6 is a cross-section view showing a relationship between a pin, a roller, and a cover, according to the second embodiment.
Figure 7:
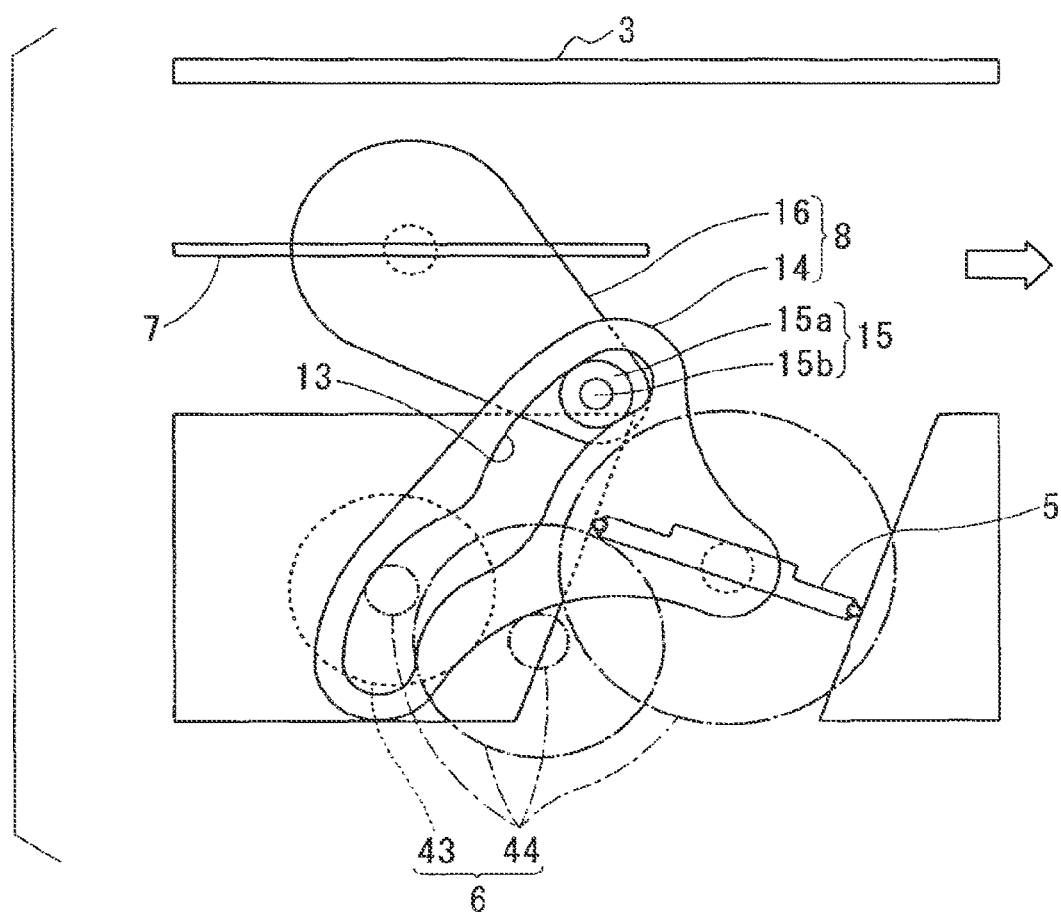
FIG. 7 is a schematic view showing a valve unit according to a conventional example.

Referring to FIGS. 5 and 6, a second embodiment of the present disclosure will be described. In the second embodiment, the same parts and components as those in the first embodiment are indicated with the same reference numerals.

In the first embodiment, the inside surface of the cover 12 is flat.

According to the second embodiment, a rib 12a is provided on the inside surface of the cover 12 to prevent the roller 15a from being dropped between a distal end of the rib 12a and the distal end of the pin 15b.

Specifically, the rib 12a is formed on the inside surface of the cover 12 along the orbit of the pin 15b.

The rib 12a may be arranged at a position including at least the moveable orbit of the pin 15b. In the second embodiment, a range where the rib 12a is provided is larger than the moveable orbit of the pin 15b as shown in FIG. 5.

In addition, as shown in FIG. 6, a plurality of ribs 12b may be provided on the cover 12 to reinforce the cover 12. FIG. 6 shows the essential configuration of the present disclosure. The cam plate 14 is not shown in FIG. 6.

In the second embodiment, the rib 12a establishes the relationship of the distance "A" and the thickness "B" that the value of the distance "A" is smaller than the value of the thickness "B".

The rib 12a can prevent the roller 15a from being dropped, and can improve a strength of the cover 12. Thus, the rib 12a can be used for reinforcing the cover 12.

The distance "A" may be formed between the pin 15b and the housing 11 when the link mechanism 8 is assembled in a different direction with respect to the direction in the above embodiments. That is, a member to prevent the roller 15a from being dropped is not limited to the cover 12.

Other link mechanism, which is accommodated in the accommodation member and is attached with the roller 15a and the pin 15b, may be used.

What is claimed is:

1. A link apparatus comprising:
a cam plate which has a cam groove;
a lever which has a roller engaged with the cam groove and a pin which is inserted through a center of the roller so that the roller is rotatably supported on the pin; and
an accommodation member accommodating the cam plate and the lever, wherein:
the accommodation member and the pin have a distance "A" therebetween;
the roller has a thickness "B" along an axial direction of the pin;
the value of the distance "A" is smaller than the value of the thickness "B";
the accommodation member is configured with a housing defining an accommodation chamber for the cam plate and the lever and a cover which is assembled to the housing;
the cover further has a rib provided along an orbit of the pin; and
the distance "A" is defined between the rib and the pin.

2. A link apparatus according to claim 1, wherein:
the cam plate is rotated along with a low-pressure-loop EGR adjusting valve which adjusts flow passage area of a low-pressure-loop EGR passage through which an EGR gas is introduced into an intake passage;
the lever is rotated along with an intake throttle valve for generating an intake negative-pressure at a confluent portion of the intake passage and the low-pressure-loop EGR passage;
the low-pressure-loop EGR adjusting valve and the cam plate are driven by an electric actuator; and
the intake throttle valve is driven by changing an output characteristic of the electric actuator.

3. A link apparatus according to claim 1, wherein
the pin includes a distal end opposite to a distal end of the rib in the axial direction of the pin; and
the orbit of the pin is an arc shape.

* * * * *